US010826628B2

(12) United States Patent
Reimer et al.

(10) Patent No.: US 10,826,628 B2
(45) Date of Patent: Nov. 3, 2020

(54) WIRELESS COEXISTENCE TEST SYSTEM, METHOD AND COMPUTER PROGRAM FOR TESTING WIRELESS COEXISTENCE

(71) Applicant: Rohde & Schwarz GmbH & Co. KG, Munich (DE)

(72) Inventors: Christian Reimer, Munich (DE); Mahmud Naseef, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/667,688

(22) Filed: Oct. 29, 2019

(65) Prior Publication Data

US 2020/0177290 A1    Jun. 4, 2020

Related U.S. Application Data

(60) Provisional application No. 62/773,946, filed on Nov. 30, 2018.

(51) Int. Cl.
*H04B 17/354* (2015.01)
*H04B 15/02* (2006.01)
*H04W 24/02* (2009.01)
*H04B 17/29* (2015.01)
*H04B 17/16* (2015.01)
*H04B 17/00* (2015.01)

(52) U.S. Cl.
CPC ......... *H04B 17/29* (2015.01); *H04B 17/0085* (2013.01); *H04B 17/16* (2015.01)

(58) Field of Classification Search
CPC ...... H04B 17/29; H04B 17/16; H04B 17/085; H04B 17/354; H04B 15/02; H04B 1/0475; H04B 1/10; H04W 24/02; H04W 24/04; H04W 24/06
See application file for complete search history.

(56) References Cited

U.S. PATENT DOCUMENTS

| | | | |
|---|---|---|---|
| 8,824,532 B2 * | 9/2014 | Cook | H04B 17/0085 375/224 |
| 10,104,114 B2 * | 10/2018 | Diebenbusch | H04L 43/028 |
| 10,542,443 B2 * | 1/2020 | Devarasetty | H04B 17/0085 |

(Continued)

*Primary Examiner* — Andrew Wendell
(74) *Attorney, Agent, or Firm* — Christensen O'Connor Johnson Kindness PLLC

(57) ABSTRACT

A wireless coexistence test system is described that comprises a wireless communication emulation module, a signal generator and a processor. The wireless communication emulation module is configured to establish an intended wireless communication link to a device under test. The signal generator is configured to generate at least a first unwanted signal and a second unwanted signal. The processor is configured to evaluate the intended wireless communication link with regard to at least one performance indicator. The processor is configured to adjust at least one of a level and a frequency of at least one of the first unwanted signal and the second unwanted signal based upon the outcome of the evaluation. The processor is configured to curve fit a performance degradation limit based upon at least one of the first unwanted signal, the second unwanted signal and the outcome of the evaluation. Further, a method and a computer program for testing wireless coexistence are described.

20 Claims, 3 Drawing Sheets

(56) References Cited

U.S. PATENT DOCUMENTS

| | | | |
|---|---|---|---|
| 2011/0257923 A1* | 10/2011 | Boulton | G01S 5/0221 702/117 |
| 2011/0270567 A1* | 11/2011 | Mow | H04B 17/0087 702/120 |
| 2013/0197848 A1* | 8/2013 | Sariaslani | G01R 29/26 702/111 |
| 2013/0326052 A1* | 12/2013 | Lin | H04W 24/08 709/224 |
| 2014/0154995 A1* | 6/2014 | Kennedy | H04B 17/3912 455/67.11 |
| 2014/0334279 A1* | 11/2014 | Lam | G11B 5/455 369/53.38 |
| 2015/0017928 A1* | 1/2015 | Griesing | H04B 17/0087 455/67.14 |
| 2015/0051872 A1* | 2/2015 | Arora | G06F 11/3428 702/186 |
| 2015/0054687 A1* | 2/2015 | Reed | H04B 17/101 342/361 |
| 2015/0139291 A1* | 5/2015 | Schmidt | H04L 27/2627 375/227 |
| 2015/0349859 A1* | 12/2015 | Emmanuel | H04B 17/12 375/224 |
| 2018/0150582 A1* | 5/2018 | Lepercq | G06F 30/392 |

* cited by examiner

WIRELESS COEXISTENCE TEST SYSTEM, METHOD AND COMPUTER PROGRAM FOR TESTING WIRELESS COEXISTENCE

CROSS-REFERENCE TO RELATED APPLICATION

This application claims the benefit of U.S. Provisional Application No. 62/773,946, filed Nov. 30, 2018, the disclosure of which is incorporated by reference herein in its entirety.

FIELD OF THE DISCLOSURE

Embodiments of the present disclosure relate generally to a wireless coexistence test system. Further, embodiments of the present disclosure generally relate to a method as well as a computer program for testing wireless coexistence.

BACKGROUND

In modern technologies, at least one radio module, also called wireless module, is typically integrated into a non-radio product to create a combined equipment. For instance, the non-radio product is a vehicle, a fridge, a data gateway, a dental x-ray system, a wearable, a plane or any other connected device/machine which obtains its respective connectivity due to the integrated radio module.

Typically, the radio modules are manufactured for a broad spectrum of applications so that receivers of the radio modules are enabled to sense more than the spectral bandwidth necessary for the intended use of the combined equipment. Thus, other signals in the vicinity or rather neighborhood of the respective radio module or rather its receiver may influence the performance of the radio module. These signals are unwanted and, therefore, they are called interferer signals. Accordingly, good radio receiver blocking performance is important in scenarios where several radio modules, in particular radio modules of various forms, are used in close proximity to each other. So far, the respective blocking tests are performed according to standards for different signal types or rather communication standards. The respective standards may correspond to the European Norm (EN) standards or rather American Society for Testing and Materials (ASTM) standards. However, the respective standards only relate to a minimum performance of the respective radio module. For instance, a minimum performance criterion shall be a packet error rate of less than or equal to 10% for 5 GHz radio local area network (RLAN) signals. In any case, the respective standard tests typically use a fixed minimum performance criterion to be met in order to comply with the respective standard.

However, this does not ensure that the respective radio module intended for being integrated in the non-radio product fits to the intended use once the radio module has been integrated in the non-radio product. Furthermore, the manufacturer of the combined equipment does not have any reliable information with regard to the performance of the respective radio module.

For example, the radio modules are typically purchased as already regulatory-tested modules, namely modules already tested according to the corresponding standard. As already mentioned, the regulatory tests however only cover the minimum performance that does not necessarily fit to the performance required for the intended use of the combined equipment. Hence, the standard tests performed do not verify whether the integrated radio module, namely the combined equipment, has a performance sufficient for the intended use or not.

Thus, there is a need for a possibility to qualify radio modules at an early stage in a reliable manner with regard to the intended use.

SUMMARY

Embodiments of the present disclosure provide a wireless coexistence test system. In an embodiment, the system comprises a wireless communication emulation module, a signal generator and a processor. The wireless communication emulation module is configured to establish an intended wireless communication link to a device under test. The signal generator is configured to generate at least a first unwanted signal and a second unwanted signal. The processor is configured to evaluate the intended wireless communication link with regard to at least one performance indicator. The processor is configured to adjust at least one of a level and a frequency of at least one of the first unwanted signal and the second unwanted signal based upon the outcome of the evaluation.

Hence, the processor is configured to adjust the level and/or the frequency of the first unwanted signal and/or the second unwanted signal based upon the outcome of the evaluation.

In other embodiments, the processor is also configured to curve fit a performance degradation limit based upon at least one of the first unwanted signal, the second unwanted signal and the outcome of the evaluation based upon the first unwanted signal, the second unwanted signal and/or the outcome of the evaluation.

Embodiments of the present disclosure also provide a method of testing wireless coexistence. In an embodiment, the method comprises the following steps:

establishing an intended wireless communication link to a device under test, generating at least a first unwanted signal and a second unwanted signal, evaluating the intended wireless communication link with regard to at least one performance indicator, adjusting at least one of a level and a frequency of at least one of the first unwanted signal and the second unwanted signal based upon the outcome of the evaluation, and curve fitting a performance degradation limit based upon at least one of the first unwanted signal, the second unwanted signal and the outcome of the evaluation.

Further, embodiments of the present disclosure provide a computer program for testing wireless coexistence with a wireless coexistence test system comprising a wireless communication emulation module, a signal generator and a processor, the computer program comprising a program code that is adapted to cause the wireless coexistence test system to perform the following steps when the computer program is run on the processor of the wireless coexistence test system:

emulating an intended wireless communication link to a device under test, generating at least a first unwanted signal and a second unwanted signal, evaluating the intended wireless communication link with regard to at least one performance indicator, adjusting at least one of a level and frequency of at least one of the first unwanted signal and the second unwanted signal based upon the outcome of the evaluation, and curve fitting a performance degradation limit based upon at least one of the first unwanted signal, the second unwanted signal and the outcome of the evaluation.

Accordingly, a customized test of wireless coexistence or rather a customized blocking test can be ensured with additional possibilities to reach a test scenario that comes closer to the expected radio frequency environment of the combined equipment than the test(s) according to the standards. The at least one performance indicator is variable and can be set in an appropriate manner to provide the customized blocking test. In general, the customized test validates the robustness of the radio module against unwanted signals, also called interferers, in the expected radio frequency environment of the intended use.

It has turned out that the performance degradation limit can be described by a respective curve, for example depending on the type of signal used for generating the unwanted signals. Thus, a curve can be fitted based on the first unwanted signal and the second unwanted signal, for example the adapted ones. This ensures that other unwanted signals, for instance intra-system signals already known, may be verified with respect to their influence on the performance of the integrated radio module even though the frequencies of these intra-system signals are not provided by the standard tests.

The evaluation may check whether the current unwanted signal, namely the first and/or the second one, exceeds a certain threshold value of the respective performance indicator applied. Depending on the performance indicator applied, the level of the unwanted signal and/or the frequency of the unwanted signal is adapted or rather adjusted so that the threshold value is exceeded or at least reached.

In general, the curve fitting procedure allows to qualify the respective radio module for a performance fit. Hence, the quality of the respective radio module to be integrated can be classified appropriately. Moreover, the curve fitting procedure ensures that the user experience of the combined equipment can be evaluated at an early stage, namely prior to the integration of the radio module in the non-radio product. Thus, an integrator, also called original equipment manufacturer (OEM), obtains the possibility to evaluate the quality of supplied radio modules according to its own quality criteria. This is called customized testing.

Prior to evaluating the quality of supplied radio modules, the integrator is enabled to develop and maintain own quality standards that may be higher or rather closer to the real requirements than the ones according to the regulatory tests following the standards. For instance, the own quality standards are assigned to a better user experience of the combined equipment than the ones according to the standards.

Thus, the original equipment manufacturer is enabled to compare radio modules supplied from different suppliers with respect to its own quality criteria. The integrator that integrates the purchased radio module into the non-radio product is enabled to qualify the respective radio module(s) and/or select a respective supplier of a radio module that fits best to the intended use of the combined equipment.

Hence, it is possible to test the radio modules beyond the minimum requirements provided by the standards, namely the regulatory tests.

For example, the curve fitting procedure is applicable independent from the frequency range intended.

Moreover, the curve fitting procedure allows different signal parameters for the unwanted signals.

The signal generator generating the first unwanted signal and/or the second unwanted signal may also be called blocking signal generator as the signals to be blocked are generated by this signal generator. Moreover, the respective signals generated are also transmitted to the device under test. Thus, the respective device under test, namely the radio module under test, may be part of the wireless coexistence test system.

The output of the curve fitting procedure may be a list of unwanted signals wherein the list may include parameters like level, frequency, bandwidth and/or signal type. The respective list results in a mature data set for a customized limit that allows to evaluate and differentiate the quality of different radio modules.

Generally, the capability of the device under test to cope with the coexistence of wanted and unwanted signals can be evaluated in an appropriate manner. This is also called robustness of the device under test against unwanted signals.

According to an aspect, the performance degradation limit is determined by the maximum levels meeting a performance indicator threshold value. The performance indicator threshold value corresponds to the threshold value for the at least one performance indicator which is used for adjusting the unwanted signals. In an embodiment, the unwanted signals are adjusted so as to reach the respective performance indicator threshold value.

Another aspect provides that the at least one performance indicator corresponds to at least one of packet error ratio, block error ratio, throughput, signal-to-noise ratio, image error and on-set picture error. These parameters can be used as performance indicators as they provide information with regard to the performance of the radio module, for example in a certain environment having interferers.

The performance degradation limit may comprise a margin area. The margin area ensures that unwanted signals may be adapted in a coarse manner. For instance, the unwanted signals are adjusted by increasing the respective level with a coarse grid.

In some embodiments, at least one of the first unwanted signal and the second unwanted signal comprises a broadband signal. Thus, the unwanted signals are not fixed to a certain frequency. Hence, the influence of broadband interferers may be investigated.

The broadband signal may comprise at least one of a multicarrier signal, an orthogonal frequency-division multiplexing signal and an additive white Gaussian noise signal. In an embodiment, at least one of the first unwanted signal and the second unwanted signal is selected from at least one of a multicarrier signal, an orthogonal frequency-division multiplexing signal and an additive white Gaussian noise signal.

In other words, continuous wave signals, additive white Gaussian noise signals, modulated signals, for instance orthogonal frequency-division multiplexing signals, signals with different bandwidth, signals with different modulation types may correspond to the unwanted signal(s) that are used for testing the wireless coexistence of the respective device under test or rather its robustness.

For example, different types may be used for generating the unwanted signal(s) or rather blocking signal(s). Hence, a further customization is ensured. This is important since different signal types may yield different performance results of the radio module. Depending on the real application scenario, the real environment is emulated in a most accurate manner by selecting the respective signal type for the unwanted signal(s) so that the influence of the signal type is also verified.

Another aspect provides that at least one of the first unwanted signal and the second unwanted signal is a replayed signal of a previously recorded I/Q signal. The respective signals generated may be recorded ones, for example digital ones. Thus, the signal generator may be established by a signal player. For example, signals may be recorded that are present in the environment of the combined equipment so that it is ensured that the real environment can be tested.

The signal generator may be configured to generate the first unwanted signal and the second unwanted signal in a subsequent manner. The first unwanted signal may be generated (and transmitted) first so that its level and/or frequency is adjusted. Once, the respective settings for the first unwanted signal have been determined, the second one is generated (and transmitted). Then, the respective settings for the second unwanted signal are determined in a similar manner.

Another aspect provides that one or more processors, processing units, or other computing devices are configured to compare a third unwanted signal with the performance degradation limit fitted. Different signals may be used for testing which match with the real environment more accurately than the ones defined by the standards. In other words, a higher flexibility with respect to the frequency positions is provided so that intra-system signals, also called intra-system interferers, can be taken into account for evaluation of the respective radio module. Such an intra-system signal may be emulated by the third unwanted signal that is generated (and transmitted to the device under test). The third unwanted signal is compared with the performance degradation limit fitted, namely the curve fitted, to evaluate whether or not the third unwanted signal, which may correspond to the intra-system signal, exceeds the performance degradation limit. This would yield that the radio module has a worse performance even though the standard tests have been passed.

The third unwanted signal may correspond to at least one modulated interferer. Put it another way, at least one modulated interferer is generated which is evaluated appropriately once the performance degradation limit was fitted. For instance, an I/Q recorded signal or rather a synthetic one may be used.

Moreover, the frequency position of an additional interferer may be set. Accordingly, the integrator is enabled to select a certain frequency for the unwanted signal, in particular the third one which may represent the intra-system signal or rather the modulated interferer.

Generally, the unwanted signals may correspond to continuous wave (CW) signals, additive white Gaussian noise (AWGN) signals and/or orthogonal frequency-division multiplexing (OFDM) signals. Moreover, the respective signals may be I/Q recorded signals and/or they have a synthetic waveform.

In general, the unwanted signals can be selected by the integrator, namely the operator of the wireless coexistence test system, to fit the customized test as close as possible to the expected real radio frequency environment scenario.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
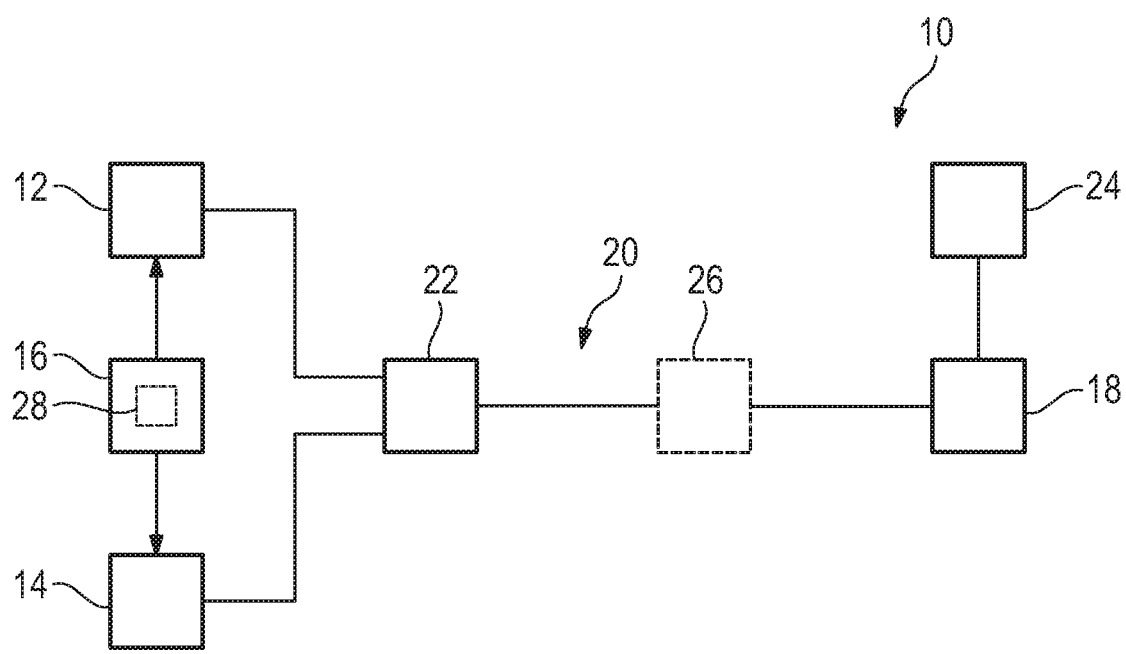
FIG. 1 schematically shows a wireless coexistence test system according to the present disclosure.

In FIG. 1, a wireless coexistence test system 10 is shown that is used for testing wireless coexistence. The wireless coexistence test system 10 has a wireless communication emulation module 12, a signal generator 14 and a processor 16 which is connected with the wireless communication emulation module 12 and the signal generator 14 in the shown embodiment.

Furthermore, the wireless coexistence test system 10 comprises a device under test 18 that is connected to the wireless communication emulation module 12 and the signal generator 14 via a transmission line 20 that can be established by a cable connection or wirelessly via an antenna. In the transmission line 20, a combiner 22 may be integrated that combines the respective signals provided by the wireless communication emulation module 12 and the signal generator 14. The device under test 18 may be a radio module that is tested with regard to its robustness against interferer signals generated by the signal generator 14.

Figure 2:
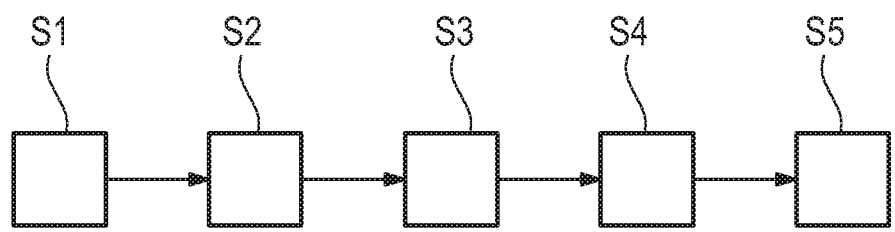
FIG. 2 shows a flow-chart illustrating a method of testing wireless coexistence according to the present disclosure.

In addition, the wireless coexistence test system 10 comprises an evaluation module 24 that is connected with the device under test 18 for performance evaluation purposes as will be described later with respect to FIG. 2. The evaluation module 24 may be part of the processor 16 or at least assigned to the processor 16.

Moreover, a spectrum analyzer 26 may be provided as indicated by the dashed lines as being an optional component providing further analysis if wanted.

Generally, the wireless communication emulation module 12, the signal generator 14 and/or the evaluation module 24 may be established by software modules that are running on the processor 16. Thus, the processor 16 provides a hardware component of the wireless coexistence test system 10. Alternatively, the wireless communication emulation module 12, the signal generator 14 and/or the evaluation module 24 is also established by a hardware component.

Moreover, a computer program 28, stored on any suitable computer readable media, may run on the processor 16. The computer program 28 includes computer code which is adapted to cause the wireless coexistence test system 10 to perform the steps outlined hereinafter with respect to FIG. 2 in which a flow-chart is shown that illustrates a method of testing wireless coexistence with regard to the device under test 18.

In a first step S1, an intended wireless communication link to the device under test 18 is established. This intended wireless communication link, namely the wanted signal, is established by the wireless communication emulation module 12 and the respective transmission line 20.

In a second step S2, a first unwanted signal and a second unwanted signal are generated by the signal generator 14 that is configured to generate the unwanted signals. The unwanted signals are transmitted to the device under test 18 via the transmission line 20 as well.

The unwanted signals may be generated and transmitted in a subsequent manner. Alternatively, the unwanted signals may be generated simultaneously. For instance, the unwanted signals and the intended wireless communication signal are transmitted via the transmission line 20 simultaneously.

In a third step S3, the intended wireless communication link is evaluated with regard to at least one performance indicator. The evaluation is done by the evaluation module 24 or rather the processor 16 connected thereto. Thus, the at least one processor 16 is configured to evaluate the intended wireless communication link appropriately with respect to the at least one performance indicator. The performance indicator may be pre-selected by the operator of the wireless coexistence test system 10.

The at least one performance indicator may correspond to at least one of packet error ratio (PER), block error ratio (BLER), throughput, signal-to-noise ratio (SNR), image error and on-set picture error. Accordingly, the operator may select at least one of the above-mentioned parameters for evaluating the performance of the device under test 18.

In a fourth step S4, a level and/or a frequency of the first unwanted signal and/or the second unwanted signal are/is adjusted based upon the outcome of the evaluation, namely the evaluation of the intended wireless communication link with regard to the at least one performance indicator.

In other words, the level and/or frequency of the first unwanted signal may be adjusted. Additionally or alternatively, the level and/or frequency of the second unwanted signal may be adjusted.

The processor 16 may control the signal generator 14 in an appropriate manner so as to adjust the respective parameter of the unwanted signal(s) generated. As the processor 16 is at least assigned to the evaluation module 24. The processor 16 receives the respective evaluation result or rather the outcome of the evaluation.

By doing the evaluation, it is checked whether the respective unwanted signal, namely the first and/or the second one, reaches or exceeds a certain threshold value of the respective performance indicator applied. The threshold value may be pre-defined by the operator so that a customized test is provided. Depending on the performance indicator applied, the level of the unwanted signal and/or the frequency of the unwanted signal is adapted or rather adjusted so that the threshold value is exceeded or at least reached by the respective unwanted signal.

In a fifth step S5, a performance degradation limit is curve fitted based upon the first unwanted signal, the second unwanted signal and/or the outcome of the evaluation. The respective curve fitting is done by the processor 16 as well.

Hence, the processor 16 is configured to perform a curve fit so that a certain curve is fitted that represents the respective performance degradation limit.

In other words, the performance degradation limit is determined by the maximum levels of the unwanted signals which meet the threshold value of the at least one performance indicator applied, also called performance indicator threshold value. As already mentioned, the respective performance indicator threshold value may be set by the operator of the wireless coexistence test system 10, for instance the manufacturer of the combined equipment, so that the respective performance degradation limit may be adapted to the intended use or rather the intended user experience of the combined equipment. Hence, the respective limit is customized to the needs.

Figure 3:
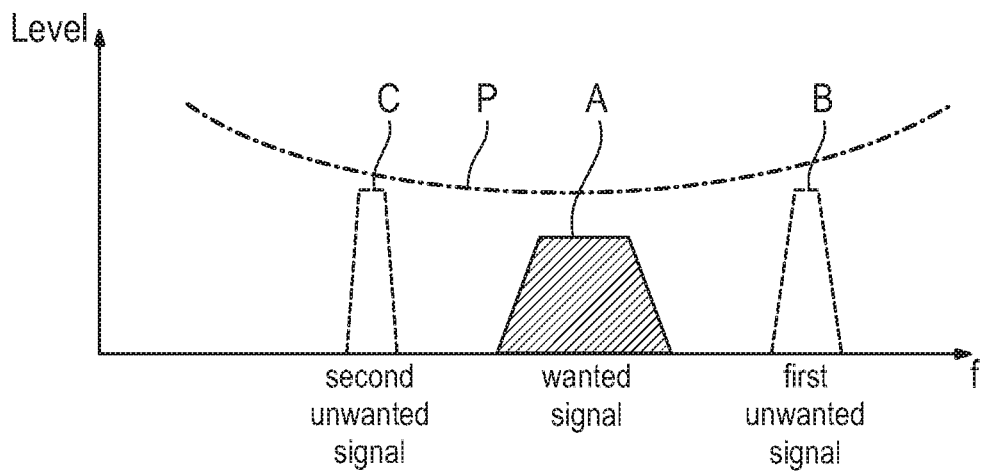
FIG. 3 shows a diagram illustrating the curve fitting procedure in a first step.

In FIG. 3, a diagram illustrating level over frequency is shown that represents the above-mentioned curve fitting procedure since a wanted signal A, which is assigned to the intended wireless communication link to the device under test 18, as well as the unwanted signals B, C are shown, namely the first unwanted signal B and the second unwanted signal C.

Moreover, the curve P representing the performance degradation limit, which is fitted to the first unwanted signal B and the second unwanted signal C at a certain performance indicator, for instance PER<10%, is shown in the respective diagram.

The respective levels of the signals A, B, C are obtained by the evaluation module 24 or rather the processor 16.

Figure 4:
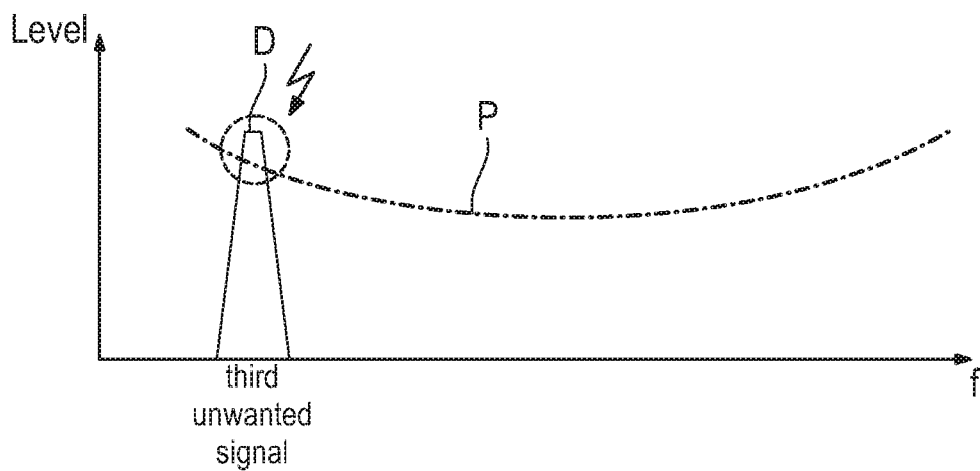
FIG. 4 shows a diagram illustrating the curve fitting procedure in a second step.

In FIG. 4, the same diagram is shown for another step of the method since a third unwanted signal D is shown that has been generated by the signal generator 14 and transmitted to the device under test 18.

The third unwanted signal D is compared with the performance degradation limit fitted, namely curve P, wherein the third unwanted signal D exceeds the performance degradation limit in the shown embodiment as indicated by the flash.

The third unwanted signal D may be an intra-system signal known by the manufacturer. The exceeding yields that the device under test 18 has a worse performance for the respective intra-system signal even though the standard tests would have been passed.

Generally, the third unwanted signal D may correspond to at least one modulated interferer.

Moreover, the operator may select the frequency position of the third unwanted signal D, namely the additional interferer, to verify the real radio frequency environment of the device under test 18.

Figure 5:
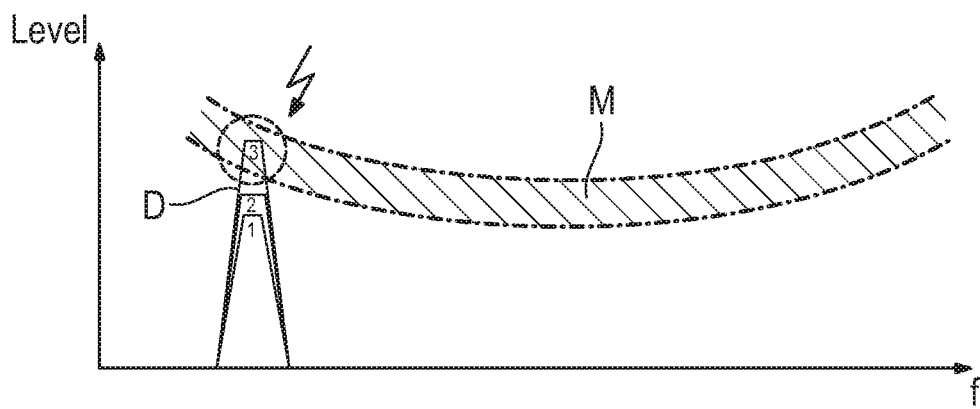
FIG. 5 shows a diagram illustrating the curve fitting procedure in a third step, and FIGS. 6A and 6B schematically show an overview which compares a standard test with a wireless coexistence test according to the present disclosure.

In FIG. 5, the diagram of FIGS. 3 and 4 is shown for another step of the method since the third unwanted signal D is compared against the performance degradation limit having a margin area M as illustrated in FIG. 5.

For instance, the level of the third unwanted signal D may be increased during the testing in a coarse manner as illustrated in FIG. 5 wherein three increasing steps indicated by 1 to 3 are shown. The third increase of the level of the third unwanted signal D is assigned to a signal level that intersects the performance degradation margin area M as indicated by the flash.

Figure 6A:
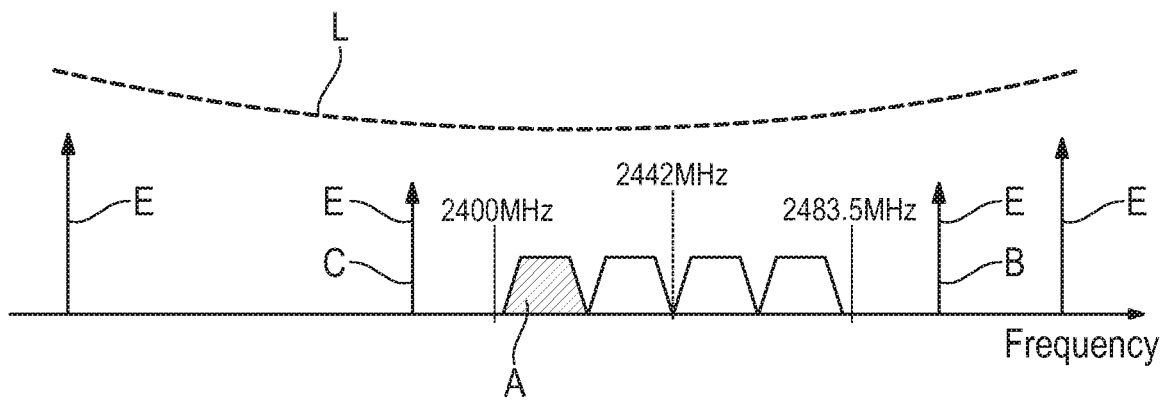
Figure 6B:
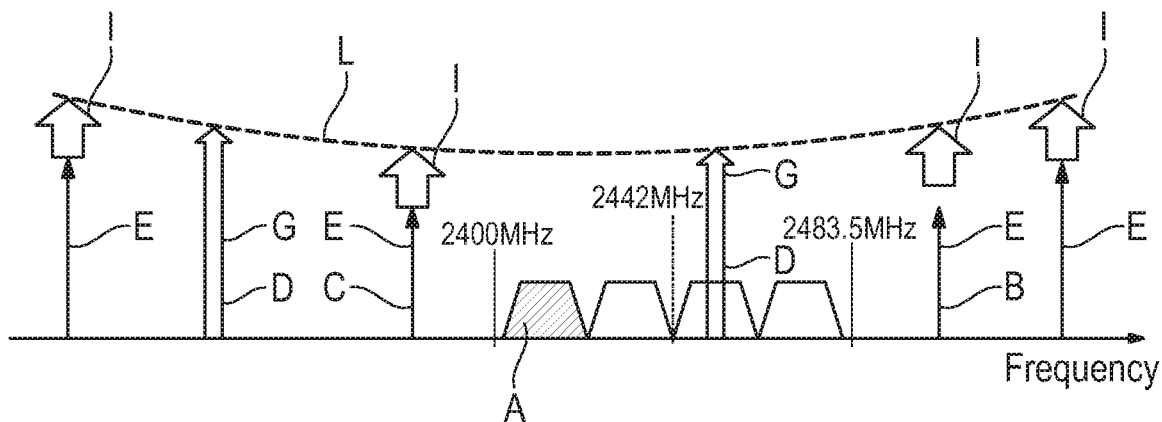

FIGS. 6A and 6B illustrate a comparison of a standard testing and a wireless coexistence test according to the present disclosure.

As shown in FIG. 6A, certain blocking signals E are located according to a standardized fixed frequency positions with fixed levels as well as the wanted signal A established by the intended wireless communication link to the device under test 18.

The levels of the blocking signals E or rather the unwanted signals do not exceed the fixed performance indicator threshold value of 10% PER illustrated by the degradation line L in FIG. 6A. Hence, the standard test has been passed.

In FIG. 6B, the differences are highlighted since the levels of the blocking signals E, namely the unwanted signals, are adjusted increased levels I until a given performance degradation is reached.

Then, a curve fitting may be done so that the performance degradation limit P, namely the dashed line in FIG. 6B, is fitted based upon the unwanted signals E, namely the adjusted ones. Put it another way, the performance degradation limit P is fitted based upon at least the first unwanted signal B and the second unwanted signal C and the at least one performance indicator evaluation mentioned earlier that causes the adjustment of the unwanted signals, for instance the respective levels.

In addition, FIG. 6B reveals that additional interferers G or rather third unwanted signals D are tested which are additional to the ones according to the standard tests as becomes obvious when comparing FIGS. 6A and 6B.

The additional interferers G or rather the third unwanted signals D are added at customized frequency positions and with optional level adjustments to represent a realistic environment of the combined equipment encompassing the device under test 18.

These additional interferers G may represent already detected or rather known intra-system interferer that may disturb the radio module of the combined equipment.

By using the wireless coexistence test system 10 or rather the respective method, the manufacturer is enabled to evaluate the combined equipment with respect to different radio modules, in particular the sturdiness of the radio modules against a real intra-system interference already known.

As described above, one or more aspects of the methods set forth herein are carried out in a computer system. In this regard, a program element is provided, which is configured and arranged when executed on a computer for carrying out the functionality described herein. In one embodiment, the program element may specifically be configured to perform the steps of method claims 10-19 set forth below.

The program element or other program code or instructions described or illustrated herein may be installed in a computer readable storage medium. The computer readable storage medium may be any one of the computing devices, control units, etc., described elsewhere herein or another and separate computing device, control unit, etc., as may be desirable. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above As should be appreciated, various embodiments of the present disclosure may also be implemented as methods, apparatus, systems, computing devices, computing entities, and/or the like, as have been described elsewhere herein. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described above with reference to block diagrams and flowchart illustrations of apparatuses, methods, systems, and computer program products. It should also be understood that each block of the block diagrams, flowchart illustrations, and related descriptions, and combinations of blocks in the block diagrams, flowchart illustrations, and related descriptions, could be implemented by special purpose hardware-based computer systems that perform the specified functions or operations, or combinations of special purpose hardware and computer instructions.

It should be understood that any of the block diagrams, flowchart illustrations, and related descriptions, or parts thereof, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks. The term computer can include any processing structure, including but is not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

In an embodiment, the wireless communication emulation module 12, the signal generator 14 and/or the evaluation module 24 includes a microprocessor and a memory storing logic modules and/or instructions for carrying out the function(s) of these components and/or any of its sub-units, either separately or in any combination. In an embodiment, the wireless communication emulation module 12, the signal generator 14 and/or the evaluation module 24 includes one or more ASICs having a plurality of predefined logic components for implementing the functionality described herein. In an embodiment, the wireless communication emulation module 12, the signal generator 14 and/or the evaluation module 24 includes one or more FPGA having a plurality of programmable logic components for implementing the functionality described herein. In an embodiment, the wireless communication emulation module 12, the signal generator 14 and/or the evaluation module 24 includes hardware circuit implementations (e.g., implementations in analog circuitry, implementations in digital circuitry, and the like, and combinations thereof) for implementing the functionality described herein. In an embodiment, the wireless communication emulation module 12, the signal generator 14 and/or the evaluation module 24 includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A wireless coexistence test system, comprising a wireless communication emulation module, a signal generator and a processor,
   the wireless communication emulation module being configured to establish an intended wireless communication link to a device under test,
   the signal generator being configured to generate at least a first unwanted signal and a second unwanted signal,
   the processor being configured to evaluate the intended wireless communication link with regard to at least one performance indicator,
   the processor being configured to adjust at least one of a level and a frequency of at least one of the first unwanted signal and the second unwanted signal based upon the outcome of the evaluation, and
   the processor being configured to curve fit a performance degradation limit based upon at least one of the first unwanted signal, the second unwanted signal and the outcome of the evaluation.

2. The wireless coexistence test system according to claim 1, wherein the performance degradation limit is determined by the of maximum levels meeting a performance indicator threshold value.

3. The wireless coexistence test system according to claim 1, wherein the at least one performance indicator corresponds to at least one of packet error ratio, block error ratio, throughput, signal-to-noise ratio, image error and on-set picture error.

4. The wireless coexistence test system according to claim 1, wherein the performance degradation limit comprises a margin area.

5. The wireless coexistence test system according to claim 1, wherein at least one of the first unwanted signal and the second unwanted signal comprises a broadband signal.

6. The wireless coexistence test system according to claim 5, wherein the broadband signal comprises at least one of a multicarrier signal, an orthogonal frequency-division multiplexing signal and an additive white Gaussian noise signal.

7. The wireless coexistence test system according to claim 1, wherein at least one of the first unwanted signal and the second unwanted signal is a replayed signal of a previously recorded I/Q signal.

8. The wireless coexistence test system according to claim 1, wherein the signal generator is configured to generate the first unwanted signal and the second unwanted signal in a subsequent manner.

9. The wireless coexistence test system according to claim 1, wherein the processor is configured to compare a third unwanted signal with the performance degradation limit fitted.

10. A method of testing wireless coexistence, comprising:
    establishing an intended wireless communication link to a device under test;
    generating at least a first unwanted signal and a second unwanted signal;

evaluating the intended wireless communication link with regard to at least one performance indicator;

adjusting at least one of a level and a frequency of at least one of the first unwanted signal and the second unwanted signal based upon the outcome of the evaluation; and curve fitting a performance degradation limit based upon at least one of the first unwanted signal, the second unwanted signal and the outcome of the evaluation.

11. The method according to claim 10, wherein a third unwanted signal is generated and compared with the performance degradation limit fitted.

12. The method according to claim 10, wherein the frequency position of an additional interferer is set.

13. The method according to claim 10, wherein at least one modulated interferer is generated.

14. The method according to claim 10, wherein the first unwanted signal and the second unwanted signal are generated in a subsequent manner.

15. The method according to claim 10, wherein the level of at least one of the first unwanted signal and the second unwanted signal is adjusted until a certain performance degradation is met.

16. The method according to claim 10, wherein the performance degradation limit comprises a margin area.

17. The method according to claim 10, wherein at least one of the first unwanted signal and the second unwanted signal is generated as a broadband signal.

18. The method according to claim 10, wherein at least one of the first unwanted signal and the second unwanted signal is selected from at least one of a multicarrier signal, an orthogonal frequency-division multiplexing signal and an additive white Gaussian noise signal.

19. The method according to claim 10, wherein at least one of the first unwanted signal and the second unwanted signal is replayed from a previously recorded I/Q signal.

20. A non-transitory computer readable medium having executable instructions stored thereon for testing wireless coexistence, wherein the executable instructions when executed by one or more computers cause the one or more computers to perform the actions of:

emulating an intended wireless communication link to a device under test;

generating at least a first unwanted signal and a second unwanted signal;

evaluating the intended wireless communication link with regard to at least one performance indicator;

adjusting at least one of a level and frequency of at least one of the first unwanted signal and the second unwanted signal based upon the outcome of the evaluation; and curve fitting a performance degradation limit based upon at least one of the first unwanted signal, the second unwanted signal and the outcome of the evaluation.

* * * * *